Jan. 23, 1934.  P. L. J. MIGUET ET AL  1,944,521
ELECTRIC FURNACE METHOD
Filed June 14, 1932  2 Sheets-Sheet 1
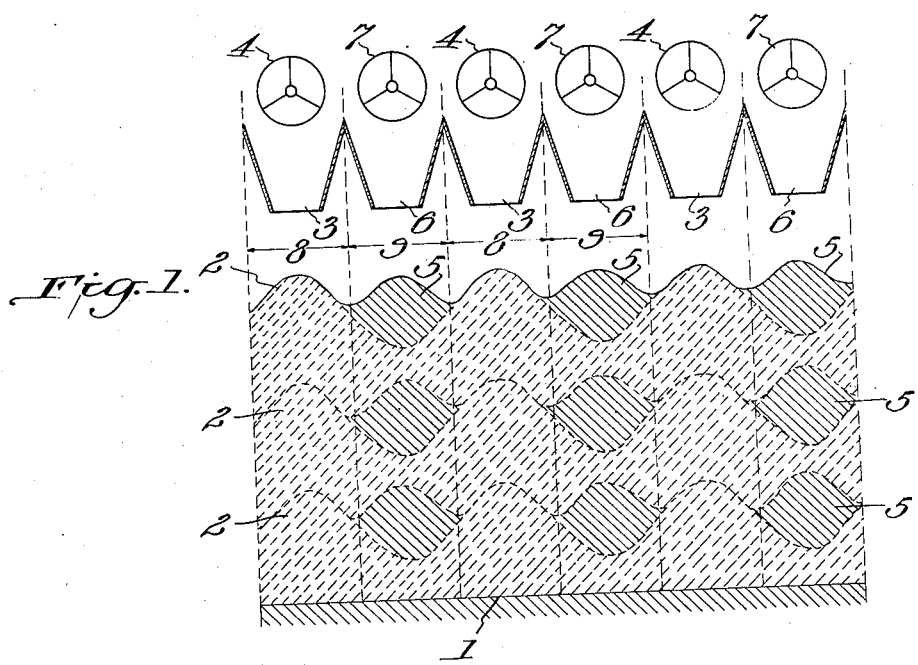
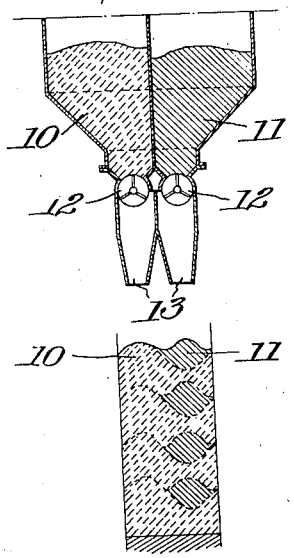
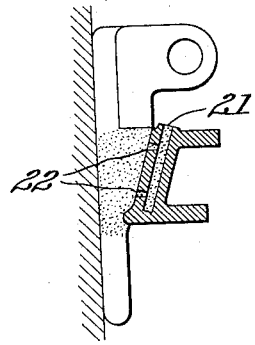
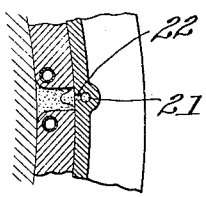

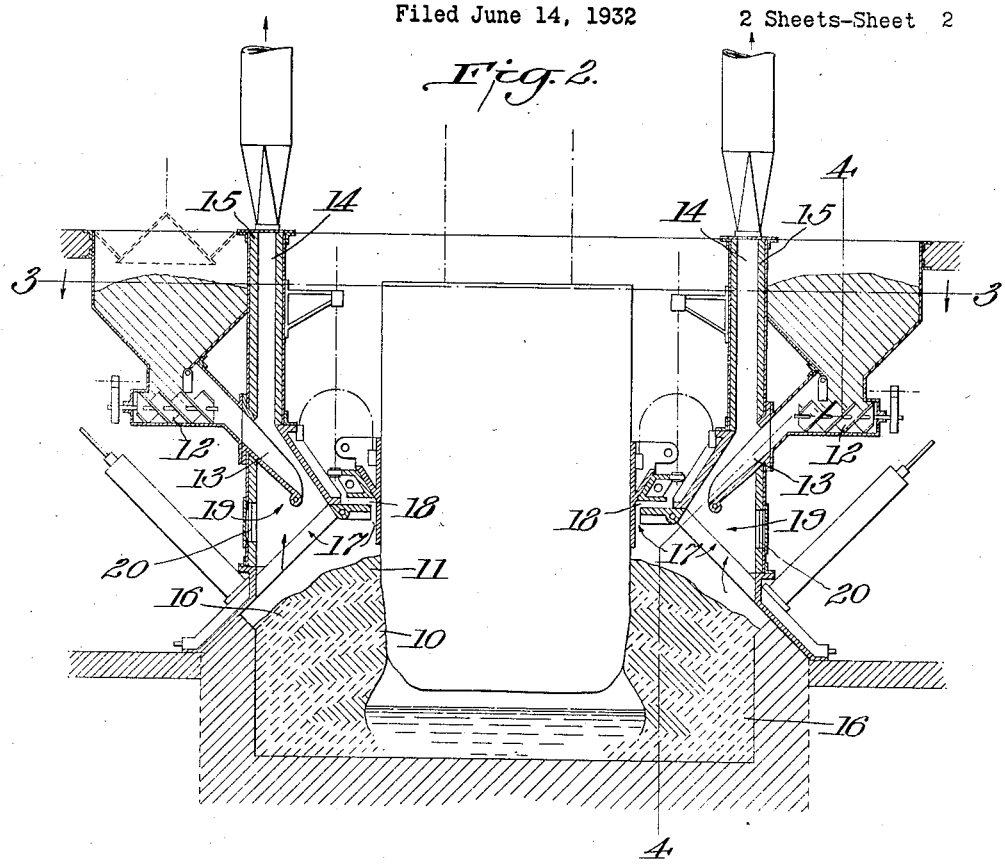
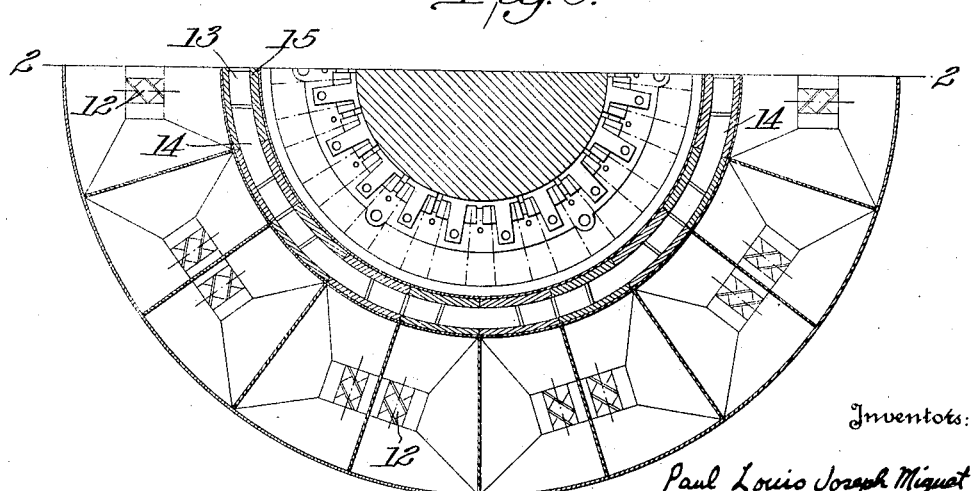

Patented Jan. 23, 1934

1,944,521

UNITED STATES PATENT OFFICE 1,944,521

ELECTRIC FURNACE METHOD

Paul Louis Joseph Miguet and Marcel Paul Perron, St. Julien de Maurienne, France Application June 14, 1932, Serial No. 617,166, and in France November 24, 1931

4 Claims. (Cl. 13—34)

The present invention relates to an improved electric furnace process and apparatus. More particularly, it relates to a process and apparatus characterized by heterogeneous charging of the materials.

One of the objects of the invention is the provision of a method of operation which will stabilize the electrical characteristics of the charge in the electric furnace and result in increased efficiency of operation. Another object is the provision of an electric furnace structure adapted to provide more efficient treatment of the charge and to increase flexibility of operation.

A known method of effecting reduction in electric furnaces is to charge the materials in horizontal layers consisting alternately of the material to be reduced alone and of the material to be reduced mixed with the reducing material. This method has the sole effect of continuously laterally spreading the current furnished by the electrode, but does not permit the stabilization of the mean conductivity of the charge because of the periodical interruptions by the layers of unmixed material to be reduced.

A further known process comprises the charging of the separate raw materials in vertical segments alternately composed of the material to be reduced and of the reducing material. This method has the double effect of discontinuously laterally spreading the current and of stabilizing the mean conductivity of the charge, but it does not result in a satisfactory reduction because the segments of material to be reduced partially escape the action of the reducing segments through premature fusion at the bottom of the segment in contact with the bath.

The first process is suitable for furnaces regulated by moving the electrode but not for those regulated by varying the potential, because of the large number of changes per day required at the regulating device. The second process is not suitable for furnaces regulated by moving the electrode, but is suitable for furnaces regulated by varying the potential, because it limits the changes at the regulating device to a small number per day. However it is not suitable in any case where a substantially complete reduction is required.

The method of the present invention is suitable for all furnaces, whether regulated by the moving of the electrode or by varying the potential, and can be used to effect any degree of reduction, either partial or complete. It spreads the current more efficiently than the first of the above-mentioned methods and less abruptly than the second; the advantages being respectively a more efficient utilization of the raw materials and a longer life of the lining of the furnace. It stabilizes the mean conductivity of the charge more effectively than the first method and in a more homogeneous way than the second; the respective advantages being more constant flow of power and less surface radiation. It avoids premature fusion of the material to be reduced more effectively than the first method, resulting in increased regularity of production.

The new method comprises charging the material heterogeneously in regularly alternating vertical zones. One set of the alternate zones spreads the current up to the lining of the furnace, as it consists exclusively of a conductive mixture of the material to be reduced with the reducing material. The other zones leave the current in the vicinity of the electrode, as they consist of the conductive mixture interspersed with lenses of the material to be reduced regularly spaced through the charge.

Such an arrangement of the charge may be effected for example by establishing the volume of the conductive mixture at about or nearly two and one half times the volume of the unmixed material to be reduced and by arranging the points of supply of each of the compositions to the furnace at regularly alternating intervals around the electrode. Two and a half volumes of the conductive mixture are first charged and then at alternate points one volume of the material to be reduced is charged, continuing in this manner in accordance with the requirements of the furnace. The variation in the charging may be obtained by manual operation, but it is preferable to use a suitable paired electromechanical interconnected mechanism.

The invention will be more particularly described with reference to the accompanying drawings, which illustrate specific embodiments of the invention. In the drawings:

Fig. 1 is a diagrammatic development of the annular zone between the electrode and the charging spouts, showing the different cones of material formed by the new method of charging;

Figs. 2 and 3 are, respectively, a sectional elevation on line 2—2 of Fig. 3, and a half plan view in partial section on line 3—3 of Fig. 2, of a furnace constructed and operated in accordance with the invention;

Fig. 4 is a partial section on line 4—4 of Fig. 2, showing the path of the charge; and Figs. 5 and 6 are detailed views of a vertical section and a horizontal section, respectively, of the lateral joint between two adjacent plates for conducting current to the electrode.

Figure 1 shows, resting upon the bottom of the furnace 1, the cones 2 of the conductive mixture thrown up by spouts 3 and screw conveyors 4. These cones of the conductive mixture are joined at their bases without any interposition of nonconductive material. In the hollows formed between cones 2 are cones 5, of the material to be reduced, thrown up by spouts 6 and screw conveyors 7. The latter cones, because of their lesser volume, do not overlap the former cones. This arrangement results in alternate zones 8 having good conductivity throughout their height and zones 9, of reduced conductivity, having lenses of non-conductive material regularly spaced therein.

The vertical conductive zones thus formed are intermediate between the mass obtained by heterogeneous charging in horizontal layers, and by separately charging coke in vertical segments, so that the current is more widely and more regularly spread, while avoiding the too abrupt changes and too extended surface of the coke segments.

The process of reduction with lateral spreading of the current by the method just described is preferably effected in apparatus of the general type shown in Figs. 2-6, which apparatus makes possible, at will, the recovery of the gases and vapors from the reduction, or the combustion of the gases and vapors with the exact amount of air necessary, or the cooling of the products with an excess of air, or the supplying of steam or any other reagent.

In Figs. 2-4 the raw materials—the conductive mixture 10 and the material to be reduced 11—are contained in paired annular hoppers. The materials are supplied by means of screw conveyors 12, driven at the required speed, to centrally partitioned charging spouts 13. In the charged mass formed in the furnace the materials are arranged as shown diagrammatically in Fig. 1 except that the cones of material to be reduced 11 are present in the form of ovoid lenses, regularly disseminated in the conductive mixture 10.

The screw conveyors are preferably provided with multiple helices, for example, three. This form of conveyor makes possible a more exact control of the relative volume of the material charged by means of fractional turns of the conveyor.

In order to supply the lenses of nonconductive material with the greatest regularity the gears driving the paired screw conveyors are electromechanically interconnected to the motors, in such a manner that, for example, two and a half turns of the conveyor supplying the conductive mixtures are succeeded by one turn of the conveyor supplying the lenses of material to be reduced, and so on in regular succession. The details of the electromechanical interconnection and the relative amounts of the materials charged may be varied as desired, but the utilization of mechanism of this type insures a definite and regular relation between the volumes and the distribution of the raw materials.

Figs. 2 and 3 also show the annular stack 14 provided with water cooled plates 15. The stack is exteriorly supported by the conductive casing of the furnace and interiorly by the casing of the electrode connections.

This stack makes possible the utmost flexibility of operation. For example, it may be used to permit the escape of gases and vapors 16 from the stoking zone of the furnace; or the gases and vapors may be recovered without the use of the usual evacuation tubes; or the gases and vapors may be completely burned by means of air 17 entering through the joint 18 between the supporting ring for the electrode connectors and the top casing of the furnace, which joint may be open or closed by a simple vertical displacement of the electrode; or they may be cooled after combustion by means of supplementary air 19 supplied to the interior of the furnace by raising the inspection doors 20, which may be also utilized for supplying steam or any other desired reagent.

The annular stack in addition to providing for the flexibility of operation illustrated by the examples outlined above, affords a very advantageous form of construction. It eliminates all lateral construction from the furnace, since, because it is rigidly fixed on the furnace casing, it serves as a support for all of the accessory devices and mechanisms such as the supply hoppers and their mechanisms, evacuation tubes for gases, dust, and the like, electrodes and their supporting structure, etc. It also forms a simple and effective closure for the furnace as its connections with the furnace casing and the supply hoppers consist of easily accessible flanges.

The joint between the supporting ring for the electrode connectors and the top of the furnace casing makes possible the complete elimination or the accurately controlled addition of air for combustion and at the same time permits the electrode to be readily moved and adjusted.

Figs. 5 and 6 show how a tight joint between adjacent electrode contact plates is provided and maintained. This is effected by injecting a paste of sugar into the tubes 21 inserted in the supporting ring of the electrode connectors. The tubes 21 open through outlets 22 into the spaces between the electrodes. This joint of sugar paste between the adjacent plates is a novel means of permitting the conductive band carrying current to the electrode to be loosened as often as desired. It provides all of the advantages of a single piece connecting band, which could not be used with electrodes of large size.

We claim:

1. A method of operating an electric reduction furnace which comprises providing a charge consisting of a contiguous mass of a conductive mixture of raw materials and regularly interspersing therein isolated portions of a relatively non-conductive raw material.

2. A method of operating an electric reduction furnace which comprises providing a charge consisting of a contiguous mass of a conductive mixture of material to be reduced and reducing material and regularly interspersing therein isolated portions of a relatively non-conductive material to be reduced.

3. A method of operating an electric reduction furnace which comprises providing a charge consisting of a contiguous mass of a conductive mixture of material to be reduced and reducing material and regularly interspersing therein isolated portions of a relatively non-conductive material to be reduced in the proportion of about one volume of the latter to two and one-half volumes of the former.

4. A method of operating an electric reduction furnace which comprises providing a charge consisting of a contiguous mass of a conductive mixture of material to be reduced and reducing material and regularly interspersing therein isolated lens-shaped portions of a relatively non-conductive material to be reduced.

PAUL LOUIS JOSEPH MIGUET.
MARCEL PAUL PERRON.